Feb. 21, 1967 M. G. BIENHOFF 3,305,849

CIRCUIT FOR PREVENTING ACCIDENTAL ERASURE OF CLOCK SIGNALS

Filed Oct. 11, 1962

MILTON G. BIENHOFF
INVENTOR.

BY Samuel Lindenberg

ATTORNEY

United States Patent Office 3,305,849

Patented Feb. 21, 1967

3,305,849

CIRCUIT FOR PREVENTING ACCIDENTAL ERASURE OF CLOCK SIGNALS

Milton G. Bienhoff, Canoga Park, Calif., assignor to The Houston Fearless Corporation, West Los Angeles, Calif., a corporation of California

Filed Oct. 11, 1962, Ser. No. 229,935
3 Claims. (Cl. 340—174.1)

This invention relates to protective circuits and more particularly to protective circuits employed with magnetic drums.

When a magnetic drum is used as a storage device in an electronic computer it usually is also used to provide clock pulses. These are employed in various operations throughout the computer. These clock pulses are normally derived from signals which were previously recorded in a clock track on the drum. The recording of signals in the clock track on the drum which are to be subsequently used as clock pulses is not as simple as recording signals elsewhere on the drum. The reason is that it is desired to record around the clock track an integral number of pulses which effectively close the ring around the track without partial pulses. Various unique arrangements have had to be devised to accomplish this for a number of not readily apparent reasons, such as minor variations in the rotational speed of the drum, minor variations or eccentricities in the drum bearing mounting and also minor variations in the drum diameter itself.

Once a clock track has been recorded on the drum, anything which either erases or distorts these clock track signals can prove to be a catastrophe as far as the operation of the computer is concerned. Since the drum surface is magnetic, and since it is well known that a magnetic media can have previously recorded signals "written over" by other signals being applied to the transducer or head, positioned over the magnetic media, it is of the utmost importance that such other signals be prevented from being applied into the clock track reading head. Such other signals do occur, either by inadvertant operation of the apparatus with which the magnetic drum is associated or by induction from power line frequencies or stray fields associated with currents flowing in leads near the magnetic drum.

Accordingly, an object of this invention is the provision of a protective arrangement for preventing accidental erasure of clock signals on a magnetic drum.

Yet another object of the present invention is the provision of a protective circuit which can be connected to a magnetic reading head for the purpose of enabling signals to be read while protecting recorded signals from being erased by stray currents.

Still another object of the present invention is the provision of a novel and useful protective circuit system for use with an electromagnetic transducer.

These and other objects of the present invention may be achieved by the provision of a circuit arrangement which is connected to the reading head positioned over a magnetic drum clock track. This circuit enables signals, which have been read, to be applied to subsequent amplification circuitry, while attenuating any incoming or stray signals to a level such that the recorded signals are not affected thereby.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1:
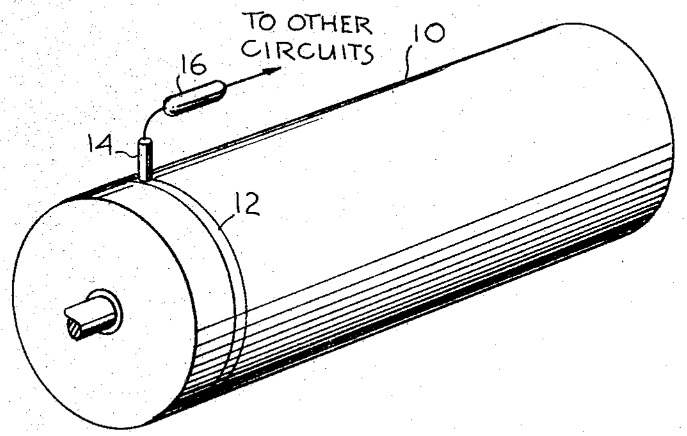
FIGURE 1 is a diagram showing a preferred location of a protective network in accordance with this invention in association with a magnetic reading head.
Figure 2:
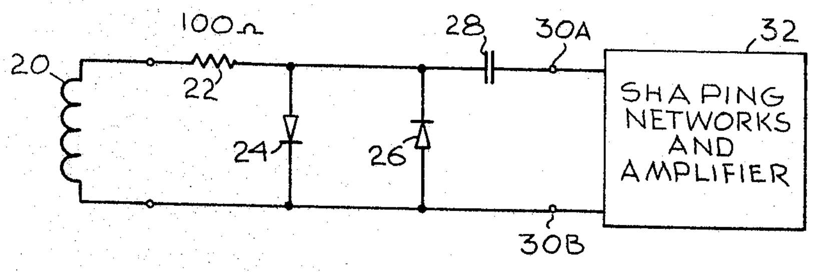
FIGURE 2 is a circuit diagram of an embodiment of this invention.

Referring now to FIGURE 1, a magnetic drum 10 has one peripheral track 12 allocated for clock track signal purposes. A reading head 14 is positioned over this track for the purpose of deriving signals from the signals previously recorded on the track 12. In accordance with this invention, a protective circuit package indicated by reference numeral 16 is connected to the reading head 14 and is positioned as physically close to it as is possible. The embodiment of the invention 16 actually consists of circuit components, in accordance with this invention which are imbedded in epoxy material in order to prevent any access thereto. The user of this invention merely receives an epoxy encased circuit with terminals suitable for connection to the clock track reading head and to subsequent shaping and amplification circuits. If desired, the reading head and protective network may be potted in an integral package to eliminate any exposed lead length between the two.

It has been found that if the currents, which are applied to a magnetic head, are on the order of less than 10 milliamperes in amplitude then they have no effect on the signals which are recorded on the magnetic medium. Therefore, in order to prevent accidental erasure of the clock track on the drum it is necessary to prevent currents of more than 10 milliamperes from getting to the reading head. However, at the same time, the signal coming from the reading head must not be attenuated any more than necessary.

In accordance with this invention, the protective circuit comprises a resistor 22, which is on the order of 100 ohms. This resistor is connected to one terminal of the reading head 20. A pair of oppositely poled diodes, preferably silicon diodes 24, 26, are connected between the other end of the resistor 22 and the other terminal of the reading head 20. A capacitor 28 completes the protective circuit. This capacitor is also connected between the other end of the resistor 22 and one of a pair of output terminals respectively 30A, 30B. The subsequent usual shaping networks and amplifier 32 can be connected to these output terminals 30A, 30B.

The read-back voltage signals generated by the reading head 20 does not exceed an amplitude of 300 millivolts peak to peak and at this voltage the silicon diodes respectively 24, 26, have a very high forward resistance. Therefore, this signal is not attenuated. The capacitor 28 has its value selected to provide a low impedance at the signal frequency of from 50 kilocycles to 1000 kilocycles and a high impedance at power frequencies of from 60 to 400 cycles. Therefore, the capacitor prevents large currents at D.C. or power frequencies from getting to and possibly burning out the silicon diodes. The silicon diodes present a very low resistance value to voltages which exceed 1 volt and acting almost as a short circuit to voltages which exceed this value. Accordingly, the 100-ohm resistor limits the head current at one volt to 10 milliamperes.

It can therefore be seen that the circuit just described serves to attenuate any incoming signals to the extent that the optimum current which can pass through the reading head will not exceed 10 milliamperes. The voltage induced in the reading head from the recorded signals is substantially unattenuated and the resultant current that flows can be applied to the subsequent electronic circuitry for the purpose of amplification and use in the remainder of the computer.

There has accordingly been described and shown herein a novel, useful arrangement for protecting any signals recorded on a magnetic medium which it is not desired to be erased. These do not have to necessarily be clock signals, nor does the magnetic medium have to necessarily be a drum. It can also be magnetic tape or a disc. The potting of the circuit further insures the safety of the arrangements since, in the course of servicing accidental contacts with the circuit are eliminated.

I claim:

1. In a system wherein a magnetic drum has a track set aside with signals recorded thereon which are to be read by a reading head having first and second output terminals, a protective circuit for preventing accidental erasure of said signals comprising means connected in series with said reading head for substantially attenuating signals having a frequency below the frequency of said recorded signals and for substantially passing signals at the frequencies of said recorded signals, means connected in shunt with said reading head for presenting a high impedance to signals below a predetermined level and for providing substantially a short circuit to signals exceeding said predetermined level, and means connected in series with said reading head for limiting the level of current which can flow in the presence of a voltage at said predetermined level to a value which is sufficiently low to leave said recorded signals substantially unaffected.

2. In a system wherein a magnetic drum has a track set aside with signals recorded thereon which are to be read by a reading head having a first and second output terminal, a protective circuit for preventing the accidental erasure of said signals comprising a capacitor, a resistor connected in series with said capacitor, means connecting the end of said resistor not connected to said capacitor to said first terminal, diode means connected between the junction of said resistor and said capacitor and said second terminal, said diode means having the property of presenting a high resistance to voltages less than a predetermined level and a low resistance to voltages exceeding said predetermined level, said resistor resistance value being selected to limit the value of current in the presence of a voltage applied thereto whose value is that of said predetermined level, the current value being selected to leave the recorded signals substantially unimpaired.

3. The protective circuit recited in claim 2 wherein said diode means comprises a first and second silicon diode connected with opposite poling between the junction of said resistor and capacitor and said second terminal.

References Cited by the Examiner

UNITED STATES PATENTS

| | | | |
|---|---|---|---|
| 2,906,928 | 9/1959 | Klein | 317—50 X |
| 3,183,517 | 5/1965 | Dorfman et al. | 346—74 |

BERNARD KONICK, *Primary Examiner.*

A. I. NEUSTADT, *Assistant Examiner.*